US010011241B2

(12) United States Patent
Lanter

(10) Patent No.: US 10,011,241 B2
(45) Date of Patent: Jul. 3, 2018

(54) SENSOR SYSTEM FOR DETECTING THE POSITIONS OF TWO COMPONENTS THAT CAN MOVE RELATIVE TO ONE ANOTHER

(71) Applicant: PolyResearch AG, Chur (CH)

(72) Inventor: Josua Lanter, Chur (CH)

(73) Assignee: POLYRESEARCH AG, Chur (CH)

( * ) Notice: Subject to any disclaimer, the term of this patent is extended or adjusted under 35 U.S.C. 154(b) by 0 days.

(21) Appl. No.: 15/179,216

(22) Filed: Jun. 10, 2016

(65) Prior Publication Data
US 2016/0362077 A1 Dec. 15, 2016

(30) Foreign Application Priority Data

Jun. 11, 2015 (CH) .................................... 00840/15

(51) Int. Cl.
*B60R 21/01* (2006.01)
*G01D 5/14* (2006.01)
*B60R 21/015* (2006.01)

(52) U.S. Cl.
CPC ............ *B60R 21/01* (2013.01); *G01D 5/145* (2013.01); *B60R 21/01554* (2014.10); *B60R 2021/01006* (2013.01); *B60R 2021/01211* (2013.01)

(58) Field of Classification Search
CPC ............. B60R 21/01; B60R 21/01554; B60R 2021/01006; B60R 2021/01211; G01D 5/145
See application file for complete search history.

(56) References Cited

U.S. PATENT DOCUMENTS

| 5,063,318 | A | * | 11/1991 | Anderson | H02K 1/2773 310/156.19 |
| 5,237,231 | A | * | 8/1993 | Blaettner | H02K 1/17 310/239 |
| 6,275,026 | B1 | * | 8/2001 | Becker | B60R 21/01554 280/735 |
| 7,521,924 | B2 | * | 4/2009 | Okumura | B60N 2/0252 324/207.2 |
| 7,999,539 | B2 | * | 8/2011 | Nishide | G01B 7/023 324/207.22 |
| 2002/0125396 | A1 | * | 9/2002 | Kume | B60N 2/0224 248/429 |
| 2003/0160607 | A1 | * | 8/2003 | Suzuki | B60N 2/0224 324/207.2 |

(Continued)

FOREIGN PATENT DOCUMENTS

DE 101 36 820 A1 2/2003
JP 2003-227703 A 8/2003

*Primary Examiner* — Darlene P Condra
(74) *Attorney, Agent, or Firm* — Buchanan Ingersoll & Rooney PC

(57) ABSTRACT

A sensor system is disclosed for detecting positions of two at least partially ferritic components that can move relative to one another, namely a stationary component and a component that can move lengthwise along a longitudinal extension of the stationary component, which are mounted right next to one another. The sensor system can include a Hall sensor and a preloaded magnet, eliminating flux concentrators and shielding sheets. The Hall sensor and the preloaded magnet are arranged along a longitudinal extension of the movable component such that relative movement of the two components is detected by monitoring a free longitudinal end of the stationary component.

15 Claims, 2 Drawing Sheets

(56) References Cited

U.S. PATENT DOCUMENTS

| | | | | |
|---|---|---|---|---|
| 2003/0222523 | A1* | 12/2003 | Wang | F16C 39/06 |
| | | | | 310/90 |
| 2004/0113403 | A1* | 6/2004 | Mills | B60N 2/0224 |
| | | | | 280/735 |
| 2004/0164826 | A1* | 8/2004 | Okumura | B60N 2/0244 |
| | | | | 335/220 |
| 2004/0196029 | A1* | 10/2004 | Okumura | B60N 2/0252 |
| | | | | 324/207.24 |
| 2004/0251723 | A1* | 12/2004 | Endo | B60N 2/071 |
| | | | | 297/284.1 |
| 2005/0062467 | A1* | 3/2005 | Barnabo | B60N 2/06 |
| | | | | 324/207.2 |
| 2005/0099175 | A1* | 5/2005 | Barnabo | B60N 2/002 |
| | | | | 324/207.2 |
| 2005/0226328 | A1* | 10/2005 | Hormis | H04N 7/012 |
| | | | | 375/240.12 |
| 2007/0069100 | A1* | 3/2007 | Schuler | B60N 2/002 |
| | | | | 248/430 |
| 2010/0026283 | A1* | 2/2010 | Nishide | B60N 2/06 |
| | | | | 324/207.26 |
| 2010/0176806 | A1* | 7/2010 | O'Day | G01D 5/145 |
| | | | | 324/207.25 |
| 2011/0017897 | A1* | 1/2011 | Christoffel | B60N 2/0722 |
| | | | | 248/429 |
| 2012/0018608 | A1* | 1/2012 | Nishide | B60N 2/067 |
| | | | | 248/429 |

* cited by examiner

SENSOR SYSTEM FOR DETECTING THE POSITIONS OF TWO COMPONENTS THAT CAN MOVE RELATIVE TO ONE ANOTHER

RELATED APPLICATION

This application claims priority under 35 U.S.C. § 119 to Swiss Patent Application No. 00840/15 filed 11 Jun. 2015, the entire content of which is hereby incorporated by reference in its entirety.

FIELD

The present disclosure relates to a sensor system for detecting positions of two components that can move relative to one another.

BACKGROUND

To an increasing extent, motorized vehicles, such as motorized passenger vehicles, are equipped with safety systems such as front, side, knee and head airbags. In the case of a collision, the passengers are to be protected by these safety systems, and the risk of injury is to be reduced. Airbags must be unfolded and inflated within a very short length of time. For this purpose, propelling charges are used, which charges fill the airbag explosively and cause them to exit from the respective lining into the interior of the motor vehicle. The arrangement of the airbags and the selection of their size represent a compromise that is to be struck among the various sizes and various weights of the motor vehicle passengers. In the case of front airbags, there is also often provision to inflate the airbags at various levels depending on the seat positions of the motor vehicle passengers. Thus, in the case of a tall passenger, whose motor vehicle seat is arranged correspondingly farther away from the dashboard, a front airbag is to be inflated more fully than in the case of a shorter motor vehicle passenger, whose motor vehicle seat is moved into a position that is closer to the dashboard. This is to prevent a motor vehicle passenger who is located closer to the dashboard from being injured by the impact of an airbag that is inflated at full power. The inflation energy for the airbag is correspondingly controlled by using graduated amounts of propelling charges that are ignited. For the control of the inflation energy for the airbag, it is therefore important to know the approximate distance between the motor vehicle seat and the dashboard. In this case, it does not result in an exact measurement of distance; it is sufficient when, for example, two states of the motor vehicle seat, namely tilted forward or leaned back, can be detected.

In the past, therefore, different mechanical or electromechanical systems had been used to determine the position of the motor vehicle seat. Mechanical or electromechanical detector systems are, however, susceptible to wear and tear and can lead to unpleasant, undesirable noises when the motor vehicle seat is adjusted.

In the course of increasing automation, motorized vehicles are being equipped more and more with electrical and electronic components that take over the function of earlier mechanical or electromechanical sensor systems. Thus, from the state of the art, non-contact sensor systems are known, with which the relative positions of two components that can move toward one another can be detected in order to generate a corresponding control signal therefrom. In the case of the motor vehicle seat, the components that can move relative to one another are, for example, a guide rail mounted on the motor vehicle bottom and a seat rail securely connected to the motor vehicle seat, which seat rail can be moved in a linear manner along the guide rail. In order to be able to determine the relative positions of the two rails, a magnetic strip can be applied to, for example, the guide rail, along which a Hall sensor that is connected to the seat rail can be moved. The magnetic strip can, as described in U.S. Pat. No. 4,909,560, change its polarity multiple times along its longitudinal extension. Upon relative movement along the magnetic strip, the output signal of the Hall sensor varies as a function of the immediately detected magnetic pole. This makes possible an incremental detection of the relative position of the motor vehicle seat.

A position sensor based on a Hall sensor, known from DE-101 36 820, allows the detection of two seat positions, tilted forward and/or leaned back, corresponding to a small and/or a large distance of the motor vehicle seat from the dashboard. In order to achieve the largest possible Hall sensor signal that can be analyzed, two publications propose keeping the distance between the magnetic poles and the surface of the Hall sensor as small as possible. In connection with known manufacturing and mounting tolerances, this can, however, cause the Hall sensor or its housing to grind against the guide rail when the seat rail is moved. Aside from the undesirable noise produced and the increased shifting resistance, this grinding contact can result in damage and in a failure of the sensor system.

A sensor arrangement that is mounted on the seat rail and that monitors a query plate mounted on the guide rail is known from JP2003-227703. This sensor arrangement includes a Hall sensor, a preloaded magnet, and a flux guide plate, which are mounted inside a housing. For example, the housing has a U-shaped configuration with a take-up gap for the query plate that is to be monitored. The Hall sensor, the preloaded magnet, and the flux guide plate can be arranged on both sides of the take-up gap. An alternative variant embodiment provides that all components of the sensor arrangement are arranged on one side of the take-up gap. The flux guide plate serves to concentrate the magnetic flux to the Hall sensor and, moreover, is to shield against disruptive influences from external magnetic fields. When the motor vehicle seat is moved from a seat position "behind" into a seat position "forward", the query plate ends up in the take-up gap of the housing of the sensor arrangement. As a result, the magnetic flux through the Hall sensor is changed and generates a signal that can be assigned to a seat position. In this sensor arrangement, the housing for the sensor arrangement is relatively large and has to be arranged very exactly in terms of the query plate. Also, the query plate has to be mounted separately on the guide rail, which increases the mounting costs.

The free front end of the guide rail that points toward the footwell is, moreover, often provided with a cover, so that the danger of damage to the guide rail is eliminated. The cover can now cause the housing for the sensor arrangement to have to be mounted projecting from the seat rail relatively far to the side, so that it does not hinder the movement of the seat rail along the guide rail. The effect of this is also that the query plate that is mounted on the guide rail has to project relatively far to the side, so that it can be accommodated when it runs over the take-up gap of the housing of the sensor arrangement. In turn, however, the query plate that projects relatively far to the side can lead to impediments, for example when an object slides laterally under the motor vehicle seat. In this case, the danger exists that the query plate will become bent, which can impair the seat adjustment or can make correct detection of the seat position impossible, since, for example, the change in signal is no longer large enough.

SUMMARY

A sensor system is disclosed for detecting positions of two at least partially ferritic components that are movable relative to one another, wherein one component is a stationary component and another movable component is movable lengthwise along a longitudinal extension of the stationary component, which two components are to be mounted next to one another, the sensor system comprising: a Hall sensor and a preloaded magnet, the Hall sensor and preloaded magnet being free of flux concentrators and shielding sheets, wherein the Hall sensor and the preloaded magnet are configured to be arranged along a longitudinal extension of a lengthwise movable component such that the sensor system will detect relative movement of two components by monitoring a free longitudinal end of a stationary component.

A method is disclosed for detecting relative positions of two at least partially ferritic components that are movable relative to one another, wherein one component is a stationary component and another movable component is movable lengthwise along a longitudinal extension of the stationary component, which two components are mounted next to one another, the method comprising: monitoring a free longitudinal end of the stationary component with a sensor system having a Hall sensor and a preloaded magnet, the Hall sensor and preloaded magnet being free of flux concentrators and shielding sheets, wherein the Hall sensor and the preloaded magnet are configured to be arranged along a longitudinal extension of a lengthwise movable component such that the sensor system will detect relative movement of the two components; and generating a control signal for controlling a degree of inflation for a driver airbag and/or passenger airbag in response to the monitoring.

BRIEF DESCRIPTION OF THE DRAWINGS

Further advantages and features disclosed herein follow from the description below of schematic representations of exemplary embodiments according to the invention. In diagrammatic representation that is not to scale.

DETAILED DESCRIPTION

Figure 1:
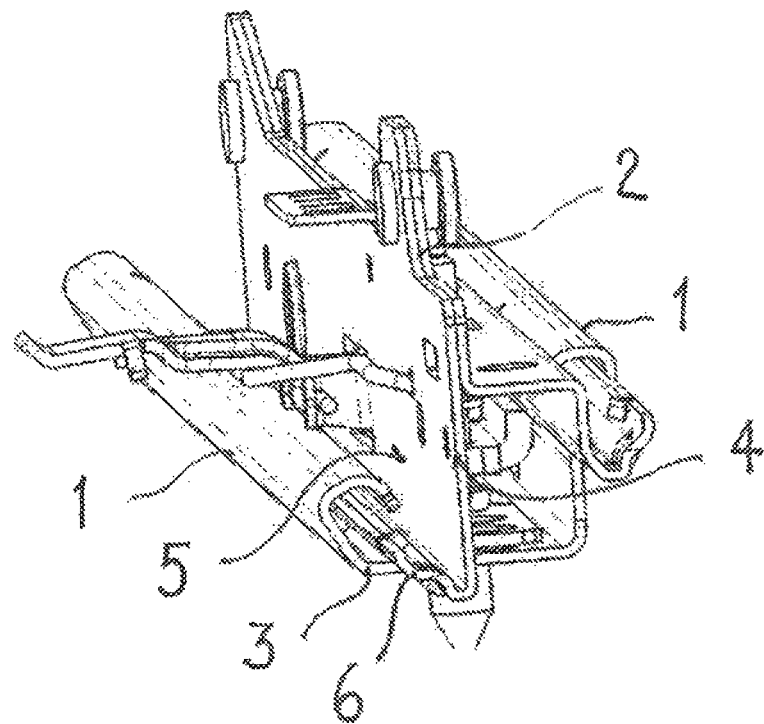
FIG. 1 shows a perspective view of a section of an exemplary seat anchoring with a stationary guide rail and a seat rail that can move therein.

A sensor system is disclosed in the Figures for detecting the positions of two components that can move relative to one another, which system can have a compact design and allow an unhindered adjustment of the position of a motor vehicle seat even with a covering of the guide rail mounted. The sensor system is, for example, to supply a signal of the maximum possible magnitude that can be analyzed so that at least two positions of the motor vehicle seat, such as tilted forward and/or leaned back, can be clearly distinguished. The sensor system can be simple and economical in design and can make possible a simple mounting.

A sensor system for detecting the positions of two at least partially ferritic components that can move relative to one another, such as a stationary component and a component that can move lengthwise along a longitudinal extension of the stationary component, which are mounted right next to one another, is disclosed. The sensor system can include (e.g., consist of) a Hall sensor and a preloaded magnet, thereby eliminating flux concentrators and shielding sheets. The Hall sensor and the preloaded magnet can be arranged along the longitudinal extension of the component that can move lengthwise in such a way that in the relative movement of the two components, a free longitudinal end of the stationary component can be monitored.

Unlike known sensor arrangements, an exemplary sensor system disclosed herein can monitor the free end of the stationary component. Upon longitudinal movement of the component that can move lengthwise, the latter can be run at least into a position in which it projects over the free longitudinal end of the stationary component. Two such positions, in which the component that can move lengthwise in each case projects over a free longitudinal end of the stationary component, usually exist. Because of the monitoring of the free longitudinal end of the stationary component, there is no longer a need for a query plate, which otherwise must be mounted in addition. The sensor system is reduced to the absolute bare minimum and, for example, consists of only a Hall sensor and a preloaded magnet. Flux concentrators or shielding sheets can be eliminated, since the ferritic components, usually magnetizable sheets and/or steel rails, take over these functions at least partially or in places. When moving the component that can be moved lengthwise relative to the stationary component, the sensor system runs over the longitudinal end of the stationary component. In this case, the magnetic flux that acts on the Hall sensor is changed, and a signal can be tapped off. Because of the possible reduction of the sensor system to absolutely necessary components, namely a Hall sensor and a preloaded magnet, the latter can be made very compact.

In an exemplary variant embodiment, the sensor system can be designed as a structural unit by the Hall sensor and the preloaded magnet being arranged in, for example, a sensor housing. As an alternative, the Hall sensor and the preloaded magnet can also be molded-in with a housing-like plastic encasing. As a structural unit, the sensor system can be easier to handle, in particular to mount. During mounting of the sensor system, separate adjustment or alignment no longer has to be done, since the Hall sensor and the preloaded magnet are already adjusted to one another inside the housing. It is sufficient to position and to anchor the structural unit, in particular the sensor housing, by means of the anchoring systems provided for this purpose, for example stopping projections or the like, at the preset position on the longitudinal side of the component that can move lengthwise. It is understood, however, that the Hall sensor and the preloaded magnet can also be mounted as single components on the longitudinal side of the component that can move lengthwise.

In another exemplary variant embodiment, the sensor system is mounted on the component that can move lengthwise in such a way that the Hall sensor is arranged closer to the stationary component than the preloaded magnet. Because of this measure, structural designs of the two components can be used to shield the Hall sensor optimally against magnetic noise fields and at the same time to achieve as good a concentration of the magnetic field of the preloaded magnet on the Hall sensor as possible.

Another exemplary arrangement of the sensor system provides that the preloaded magnet is 0.5 mm to 10 mm from the Hall sensor vertically. This distance proves to be suitable for a high enough sensitivity of the sensor system to achieve a sufficiently large stroke; e.g., a sufficiently large magnetic field change, of, for example, 20 mT up to 80 mT, when running over the free longitudinal end of the stationary component.

Because of the use of the magnetic-field-conducting properties of the two components that can move relative to one another, the sensor system can be very easily introduced so that the direction of the magnetization of the preloaded magnet is not absolutely critical. Nevertheless, an exemplary variant embodiment of the sensor arrangement provides that the preloaded magnet has a magnetization whose vector has an angle of 0° to 180° with a measuring surface of a Hall measuring field of the Hall sensor.

The sensor system can be mounted directly at the position, provided for this purpose, on the longitudinal side of the component that can move lengthwise. An alternative exemplary variant embodiment can provide that the Hall sensor and/or the preloaded magnet are mounted in such a way that they are some distance (e.g., spaced but still able to achieve the functions disclosed herein) from the component that can move lengthwise.

Exemplary sensor systems disclosed herein can be configured for use for determining the position of a motor vehicle seat in a motorized vehicle. The stationary component is in this case for example a guide rail that is securely anchored in the motor vehicle, while the component that can move lengthwise is for example, a seat rail to which the motor vehicle seat is anchored. The two rails together form an adjustable seat anchoring in a motorized vehicle.

In an exemplary variant of the sensor system, the Hall sensor and the preloaded magnet can be arranged at a distance from the seat rail that can move lengthwise in order to detect in the seat adjustment the running-over of a free longitudinal end of the stationary guide rail. In principle, a front longitudinal end of the guide rail that projects into the footwell or else a rear end of the guide rail facing away from it can be detected. The sensor system accordingly supplies a signal for a seat position "forward" or for a seat position "behind". Because the forward seat position is considered to be the more critical from the standpoint of safety, it proves to be suitable—when the sensor system monitors the running-over of the front free longitudinal end of the guide rail—when the seat rail projects over the free end of the guide rail in the seat position "forward".

In another variant embodiment, the seat rail can be configured in such a way that it at least largely shields the Hall sensor of the sensor system. To this end, the seat rail has an extension that projects laterally and upward essentially along the entire longitudinal extension thereof. This lateral extension encompasses the Hall sensor on a longitudinal side and shields it, while the opposite longitudinal side is shielded by the seat rail. The mounted Hall sensor is covered from above by the preloaded magnet arranged above it. Because of this design of the seat rail, on the one hand, an optimal shielding against magnetic noise fields can be achieved, and, on the other hand, a very good concentration of the magnetic field of the preloaded magnet on the Hall sensor is ensured.

Exemplary sensor systems in its above-described variant embodiments can be designed in particular for the monitoring of the position of a motor vehicle seat in order in this case to generate control signals for controlling a degree of inflation for a driver airbag and/or passenger airbag.

FIG. 1 diagrammatically shows a section of a seat anchoring, for example the front seat of a motorized vehicle. The seat anchoring includes a stationary guide rail 1 that is anchored on the bottom of the motorized vehicle and a seat rail 2 that can move relative thereto, along the longitudinal extension of the guide rail 1. The seat rail 2 is connected to the motor vehicle seat. It is understood that for each front motor vehicle seat, two guide rails and two seat rails are provided. For the sake of greater clarity, only one of the two rail combinations 1, 2 is shown in FIG. 1. In particular, in this case, FIG. 1 shows the arrangement of guide rail 1 and seat rail 2, closer to a vehicle-body wall, looking toward a free longitudinal end 3 of the guide rail 1, which faces a footwell of a passenger compartment. The guide rail 1 and the seat rail 2 at least in part consist of a ferritic material, such as a magnetizable steel. The free longitudinal end 3 of the guide rail 1 that faces the footwell can be covered with a plastic cover, not shown in greater detail, for the purpose of minimizing the danger of injuries on the edges of the guide rail 1. The reference number 5 refers to a side wall of the seat rail that faces the guide rail 1. An extension that projects laterally and upward from the side wall 5 of the guide rail 1 is provided with the reference number 6.

When adjusting the motor vehicle seat from a seat position "behind" into a seat position "forward", the seat rail 2, in which the guide rail 1 runs, slides in the direction of the footwell of the passenger compartment until its front end 4 projects over the free longitudinal end 3 of the guide rail 1. This is the situation that is depicted in FIG. 1. Exemplary embodiments can specifically take advantage of the fact that the front end 4 of the seat rail 2 in the seat position "forward" projects over the free longitudinal end 3 of the guide rail 1.

Figure 2:
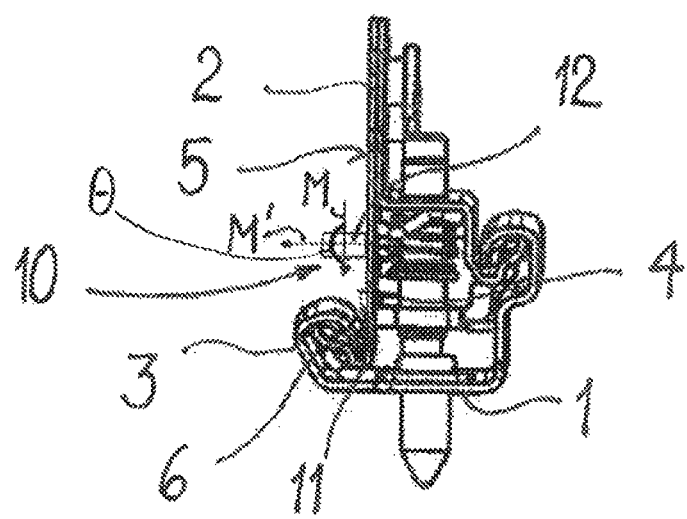
FIG. 2 shows a front view of the seat anchoring of FIG. 1 with an exemplary mounted sensor system.

FIG. 2 shows a front view of the arrangement of the guide rail 1 and seat rail 2 that is run into it. In this case, FIG. 2 shows the situation in which the front end 4 of the seat rail 2 and the free longitudinal end 3 of the guide rail 1 are arranged at the same height. A sensor system 10 is arranged on a side wall 5 of the seat rail 2 that faces the guide rail 1. The sensor system 10 includes (e.g., consists of) a Hall sensor 11 and a preloaded magnet 12, which is designed as a permanent magnet. The preloaded magnet 12 has, for example, a magnetic flux density of 0.3 T to 1.5 T. The exemplary sensor system 10 can thus be reduced to the absolute bare minimum, and flux concentrators or shielding sheets are eliminated.

The arrangement of the sensor system 10 on the side wall 5 of the seat rail then depends on what distance of the motor vehicle seat from a dashboard of the motorized vehicle is defined as seat position "forward". In any case, the arrangement of the sensor system 10 on the side wall 5 of the seat rail is selected in such a way that the latter is moved longitudinally over the free longitudinal end 3 of the guide rail 1 to reach the seat position "forward". When moving the motor vehicle seat into the seat position "forward", the sensor system 10 thus runs over the free longitudinal end 3 of the guide rail 1. The magnetic field of the preloaded magnet 12, which otherwise is very homogeneously directed onto the Hall sensor 11 using the guide rail 1 and the seat rail, undergoes a relatively strong change when reaching the free longitudinal end 3 of the guide rail 1. As a result, the magnetic flux is changed by the measuring field of the Hall sensor 11. A signal can be generated from this change, which signal can be forwarded to, for example, a system for controlling the inflation of an airbag system, so that the latter, if necessary, provides for a lesser inflation of the airbag.

The Hall sensor 11 of the sensor system 10 can be arranged in such a way that it is shielded as well as possible by the seat rail 2 in the lateral direction. The seat rail 2 in this case has an extension 6 that projects laterally and upward essentially along the entire longitudinal extension thereof. This lateral extension 6 encompasses the Hall sensor 11 on a longitudinal side and shields it, while the opposite longitudinal side is shielded by the side wall 5 of the seat rail 2. The mounted Hall sensor 11 is covered from above by the preloaded magnet 12 that is arranged above it. In this case, the preloaded magnet 12 can be 0.5 mm to 10 mm from the Hall sensor 11 vertically. In FIG. 2, the arrows M and M' refer to two extreme directions of the magnetization of the permanent magnet 12. The vector of the magnetization M of the permanent magnet 12 can encompass, with the surface of a measuring field of the Hall sensor 11, an angle that is 0° to 180°.

Figure 3:
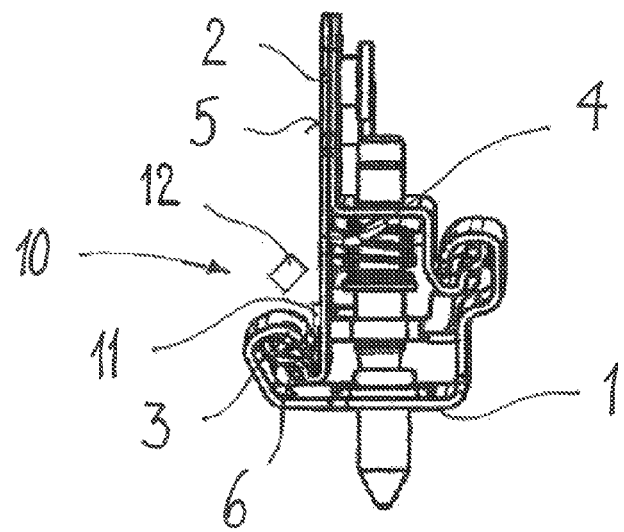
FIG. 3 shows a front view according to FIG. 2 with an alternative exemplary arrangement of a sensor system.

In a depiction analogous to FIG. 2, FIG. 3 shows an exemplary variant embodiment of the sensor system, which in turn is referred to overall with the reference number 10. The same components bear the same reference numbers as in FIG. 2. The Hall sensor 11 of the sensor system 10 is arranged on, for example, the side wall 5 of the seat rail 2 that faces the guide rail 1. In this case, the Hall sensor 11 can be placed in such a way that it is encompassed by, on the one hand, the lateral extension 6, and it is shielded by, on the other hand, the side wall 5 of the seat rail 2. The preloaded magnet 12 can be mounted, for example, at a distance from the side wall 5 of the seat rail and can be rotated relative to the measuring field of the Hall sensor 11. As a result, the vector of the magnetization comprises with the surface of the measuring field, for example, an acute angle. By virtue of the fact that the sensor system 10 uses the adjacent side surface 5 and the extension 6, as well as the section of the guide rail 1 encompassing the extension 6, as flux concentrators, the alignment of the preloaded magnets 12 on the Hall sensor 11 plays only a subordinate role. In FIG. 3, the preloaded magnet 12 is depicted symbolically "floating" in air. It is understood, however, that the preloaded magnet 12 can be anchored on a carrier, which in turn can be anchored on the seat rail 2.

Figure 4:
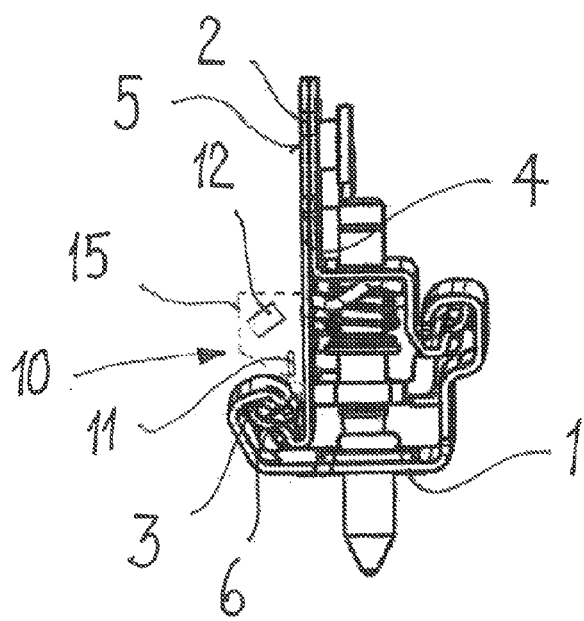
FIG. 4 shows another variant exemplary embodiment disclosed herein.

FIG. 4 shows another exemplary variant embodiment of a sensor system which in turn is referred to overall with the reference number 10. In turn, the same reference numbers refer to the same components. In the embodiment depicted, for example, the Hall sensor 11 and the preloaded magnet 12 of the sensor system 10 are both arranged at some distance from the side wall 5 of the seat rail 2. To this end, they can be arranged as a structural unit in a sensor housing 15, which is indicated in broken lines in FIG. 4. As an alternative, the Hall sensor 11 and the preloaded magnet 12 can also be molded-in with a housing-like plastic encasing. As a structural unit, the sensor system 10 is even easier to handle, in particular to mount. FIG. 4 shows that the preloaded magnet 12 in turn can be rotated relative to the Hall sensor 11. It is understood, however, that the preloaded magnet 12 can also be arranged in a position that is analogous to the depiction in FIG. 2. The vector of the magnetization of the permanent magnet 12 can have, with the surface of the measuring field of the Hall sensor 11, an angle θ that is 0° to 180°.

It is understood that the Hall sensor 11 of the sensor system 10 can be connected, for example, via cable connections, to a control unit for the control of the degree of inflation of the airbag system. For the sake of greater clarity and since it is not essential for understanding the invention, the depiction of cables and the like was, however, eliminated in the figures. Unlike known sensor arrangements, the sensor system 10 can monitor the free longitudinal end 3 of the guide rail 1 that is mounted securely in a motorized vehicle. Upon longitudinal movement of the seat rail 2, the latter is run into a position in which it projects over the free longitudinal end 3 of the guide rail 1. Because of the monitoring of the free longitudinal end 3 of the guide rail, there is no longer a need for a query plate, which must be mounted in addition in the case of known sensor arrangements. The sensor system 10 can thus be reduced to the absolute bare minimum and can consist of only a Hall sensor 11 and a preloaded magnet 12. Flux concentrators or shielding sheets are thereby eliminated, since the ferritic rails 1, 2, usually magnetizable sheets and/or steel rails, take over these functions at least partially or in places. Upon longitudinal movement of the seat rail 2 relative to the guide rail 1, the sensor system 10 runs over the free longitudinal end 3 of the guide rail 1. In this case, the magnetic flux that acts on the Hall sensor 11 is changed, and a signal can be tapped off. Because of the reduction of the sensor system 10 to the components that are absolutely necessary, namely a Hall sensor 11 and a preloaded magnet 12, the sensor system 10 can be made extremely compact.

It will thus be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Sensor system for detecting positions of two at least partially ferritic components that are movable relative to one another, wherein one component is a stationary component and another movable component is movable lengthwise along a longitudinal extension of the stationary component, which two components are to be mounted next to one another, the sensor system comprising:
   a Hall sensor and a preloaded magnet, the Hall sensor and preloaded magnet being free of flux concentrators and shielding sheets, wherein the Hall sensor and the preloaded magnet are configured to be arranged along a longitudinal extension of a lengthwise movable component such that the sensor system will detect relative movement of two components by monitoring a free longitudinal end of a stationary component,
   wherein the Hall sensor and the biasing magnet are assembled to form a unitary structure which is mounted at an outside longitudinal wall of the movable component.

2. Sensor system according to claim 1, wherein the sensor system consists of:
   the Hall sensor and the biasing magnet which are arranged in a sensor housing.

3. Sensor system according to claim 2, in combination with at least partially ferritic components that are movable relative to one another, wherein one component is a stationary component and another movable component is movable lengthwise along a longitudinal extension of the stationary component, which two components are mounted next to one another, wherein the Hall sensor and the preloaded magnet or the sensor housing are anchored on the lengthwise movable component.

4. Sensor system according to claim 3, wherein the Hall sensor is arranged closer to the stationary component than the biasing magnet.

5. Sensor system according to claim 3, wherein the Hall sensor and/or the biasing magnet are mounted at a distance from the lengthwise movable component.

6. Sensor system according to claim 3, wherein the stationary component is a guide rail having a free longitudinal end that is monitored by the sensor system, and the lengthwise movable component is a seat rail with an adjustable seat anchoring in a motorized vehicle.

7. Sensor system according to claim 6, wherein the Hall sensor and the biasing magnet are arranged at a distance from the seat rail.

8. Sensor system according to claim 6, wherein the seat rail projects over the free longitudinal end of the guide rail in a "tilted-forward" seat position.

9. Sensor system according to claim 6, wherein relative to a mounting position of the guide rail and the seat rail, the Hall sensor is encompassed in a mounted state by, on one hand, a longitudinal side of the seat rail configured to move lengthwise and by a metal extension that projects laterally and upward essentially along an entire longitudinal extension of the longitudinal side of the seat rail, while the Hall sensor is covered from above by the biasing magnet that is arranged there above.

10. Sensor system according to claim 6, wherein the Hall sensor and/or the biasing magnet are mounted at a distance from the lengthwise movable component.

11. Sensor system according to claim 3, wherein the biasing magnet is 0.5 mm to 10 mm from the Hall sensor vertically.

12. Sensor system according to claim 3, wherein the biasing magnet has a magnetization whose vector has an angle of 0° to 180° with a measuring surface of a Hall measuring field of the Hall sensor.

13. Sensor system according to claim 1, wherein the biasing magnet is 0.5 mm to 10 mm from the Hall sensor vertically.

14. Sensor system according to claim 1, wherein the biasing magnet has a magnetization whose vector has an angle of 0° to 180° with a measuring surface of a Hall measuring field of the Hall sensor.

15. A method is disclosed for detecting relative positions of two at least partially ferritic components that are movable relative to one another, wherein one component is a stationary component and another movable component is movable lengthwise along a longitudinal extension of the stationary component, which two components are mounted next to one another, the method comprising:

monitoring a free longitudinal end of the stationary component with a sensor system having a Hall sensor and a biasing magnet, the Hall sensor and biasing magnet being free of flux concentrators and shielding sheets, wherein the Hall sensor and the biasing magnet are configured to be arranged along a longitudinal extension of the lengthwise movable component such that the sensor system will detect relative movement of the two component, and wherein the Hall sensor and the biasing magnet are assembled to form a unitary structure having a fixed relative position to one another and are dislocated together; and generating a control signal for controlling a degree of inflation for a driver airbag and/or passenger airbag in response to the monitoring.

* * * * *